US011365769B2

(12) United States Patent
Balsdon et al.

(10) Patent No.: US 11,365,769 B2
(45) Date of Patent: Jun. 21, 2022

(54) ENERGY EFFICIENT A/C COMPRESSOR CLUTCH

(71) Applicant: Litens Automotive Partnership, Woodbridge (CA)

(72) Inventors: David Balsdon, Woodbridge (CA); Hao Q. Tran, North York (CA); Andrew M. Boyes, Aurora (CA)

(73) Assignee: LITENS AUTOMOTIVE PARTNERSHIP, Woodbridge (CA)

( * ) Notice: Subject to any disclaimer, the term of this patent is extended or adjusted under 35 U.S.C. 154(b) by 0 days.

(21) Appl. No.: 17/040,860

(22) PCT Filed: Mar. 26, 2019

(86) PCT No.: PCT/CA2019/050369
§ 371 (c)(1),
(2) Date: Sep. 23, 2020

(87) PCT Pub. No.: WO2019/183723
PCT Pub. Date: Oct. 3, 2019

(65) Prior Publication Data
US 2021/0018049 A1 Jan. 21, 2021

Related U.S. Application Data

(60) Provisional application No. 62/778,097, filed on Dec. 11, 2018, provisional application No. 62/648,930, (Continued)

(51) Int. Cl.
*F16D 27/105* (2006.01)
*F16D 13/76* (2006.01)
(Continued)

(52) U.S. Cl.
CPC .............. *F16D 13/76* (2013.01); *B60K 25/02* (2013.01); *F16D 27/105* (2013.01); *F16D 13/08* (2013.01);
(Continued)

(58) Field of Classification Search
CPC ......... F16D 27/025; F16D 27/102–105; B60K 25/02
See application file for complete search history.

(56) References Cited

U.S. PATENT DOCUMENTS 3,735,847 A 5/1973 Brucken
3,831,723 A 8/1974 Briar et al.
(Continued)

FOREIGN PATENT DOCUMENTS

GB 1368048 A 9/1974

OTHER PUBLICATIONS

International Search Report and Written Opinion for PCT/CA2019/050369 dated Jun. 3, 2019.

*Primary Examiner* — David R Morris
(74) *Attorney, Agent, or Firm* — Millman IP Inc.

(57) ABSTRACT

An automotive air conditioning assembly including a scroll compressor and a wrap spring clutch. The wrap spring clutch enables the use of a comparatively smaller pulley (a diameter of at most 85 mm) which comparatively increases the compressor speed and hence cooling capacity at a given engine speed. The clutch requires low power (e.g. less than 5 Watts) for continuous operation.

9 Claims, 5 Drawing Sheets

Related U.S. Application Data filed on Mar. 27, 2018, provisional application No. 62/648,385, filed on Mar. 26, 2018.

(51) Int. Cl.
    *B60K 25/02*     (2006.01)
    *F16D 13/08*     (2006.01)
    *F16D 27/00*     (2006.01)

(52) U.S. Cl.
    CPC .. *F16D 2027/002* (2013.01); *F16D 2027/008* (2013.01)

(56) References Cited

U.S. PATENT DOCUMENTS

| | | | |
|---|---|---|---|
| 3,865,222 A | | 2/1975 | Briar |
| 4,262,787 A | * | 4/1981 | Takefuta ............... F16D 27/105 |
| | | | 192/35 |
| 4,718,526 A | | 1/1988 | Koitabashi |
| 6,169,347 B1 | | 1/2001 | Sakamoto et al. |
| 9,441,680 B2 | * | 9/2016 | Boyes .................... F02B 67/06 |
| 2014/0238809 A1 | | 8/2014 | Boyes et al. |
| 2014/0291104 A1 | * | 10/2014 | Boyes ................... F16D 27/105 |
| | | | 192/75 |
| 2016/0040733 A1 | | 2/2016 | Staniewicz et al. |

\* cited by examiner

ENERGY EFFICIENT A/C COMPRESSOR CLUTCH

FIELD

The specification relates generally to clutches. In particular, the specification relates to air conditioning compressor clutches for use in vehicles with accessory drive belts.

BACKGROUND OF THE DISCLOSURE

Automotive air conditioning (A/C) compressors are typically clutched to accessory belt drives via a friction clutch. The technology has been widely deployed such that the cost of friction clutches is relatively low. The friction clutch, however, requires a fair amount of power to activate it and maintain it in the engaged state so it would be desirable to improve upon such clutches by providing a more energy efficient clutch.

An alternative clutch, however, still has to meet the demanding characteristics required of A/C clutches, chief of which is a relatively high torque holding requirement and the ability to withstand high peak torque loads, e.g., when the clutch is first engaged. An alternative clutch has to have good durability over a lengthy duty cycle.

One possibility for an alternative A/C clutch is based on the wrap spring clutch. Examples of wrap spring clutches are known from U.S. Pat. Nos. 8,387,767; 9,068,603; 9,038,799; 9,267,552 and 9,556,918. Such clutches, however, may not be configured for or able to handle the high forces required of an A/C clutch and they may not be sufficiently efficient over the friction A/C clutch.

SUMMARY OF THE DISCLOSURE

In one aspect, a rotary clutch for an air conditioning compressor is provided. The compressor includes a drive shaft which defines a rotary axis. The clutch includes a pulley, a hub, a wrap spring clutch, a carrier and an actuator. The pulley is mounted to the compressor for rotation about the rotary axis. The pulley has an outer circumferential surface configured to be driven by an endless power transmitting member, and an inner circumferential surface providing a clutch torque transfer surface. The hub is configured to be secured to the compressor drive shaft. The hub includes a drive lug for driving the hub. The wrap spring clutch has a power transfer end portion, a control end portion, and a plurality of helical coils therebetween for engaging the torque transfer surface. The carrier has a circumferential wall and a flange at an axial end thereof. The carrier circumferential wall supports a plurality of the helical coils, and the flange has a groove for guiding the power transfer end portion so that an end thereof is in abutting relationship with the hub drive lug. The actuator includes an electromagnet and an armature plate connected to the wrap spring clutch control end portion. The electromagnet is mounted to the compressor. The armature plate has a circumferential wall slidably disposed within the carrier circumferential wall. The armature plate is axially moveable between an engaged position, in which the armature plate is in abutting relationship with the pulley, and a disengaged position, in which the armature plate is not in abutting relationship with the pulley.

Activating the electromagnet generates a magnetic field that urges the armature plate to the engaged position so that the armature plate rotates together with the pulley. The rotation of the armature plate causes the helical coils to expand into gripping engagement with the torque transfer surface, which imparts rotational movement to the wrap spring clutch which, in turn, imparts rotational movement to the hub and compressor shaft.

The rotary clutch can be utilized to provide a device that uses much less power than the friction clutch yet is still able to handle the loads imposed thereon by the engine accessory drive and the high inertia A/C compressor.

In another aspect, an automotive air conditioning assembly is provided which includes a scroll compressor, including a drive shaft defining a rotary axis; and a rotary clutch. The clutch includes a pulley mounted to the compressor for rotation about the rotary axis. The pulley has an outer circumferential surface configured to be driven by an endless power transmitting member, and an inner circumferential surface providing a clutch torque transfer surface. A hub is configured to be secured to the compressor drive shaft. The hub includes a drive lug for driving the hub. A wrap spring clutch has a power transfer end portion, a control end portion, and a plurality of helical coils therebetween for engaging the torque transfer surface. A carrier guides the power transfer end portion so that an end thereof is in abutting relationship with the hub drive lug. An actuator including an electromagnet and an armature plate connected to the wrap spring clutch control end portion, controls clutch engagement and disengagement. The electromagnet is mounted to the compressor, and the armature plate is axially moveable between an engaged position, in which the armature plate is in abutting relationship with the pulley, and a disengaged position, in which the armature plate is not in abutting relationship with the pulley. The pulley has a diameter of 85 mm or less and the electromagnet requires less than 15 Watts power to generate a magnetic field in order to urge the armature plate to the engaged position so that the armature plate rotates together with the pulley, wherein rotation of the armature plate causes the helical coils to expand into gripping engagement with the torque transfer surface to thereby impart rotational movement to the wrap spring clutch which, in turn, imparts rotational movement to the hub and compressor drive shaft.

BRIEF DESCRIPTIONS OF THE DRAWINGS

For a better understanding of the various embodiments described herein and to show more clearly how they may be carried into effect, reference will now be made, by way of example only, to the accompanying drawings in which.

DETAILED DESCRIPTION

Figure 1:
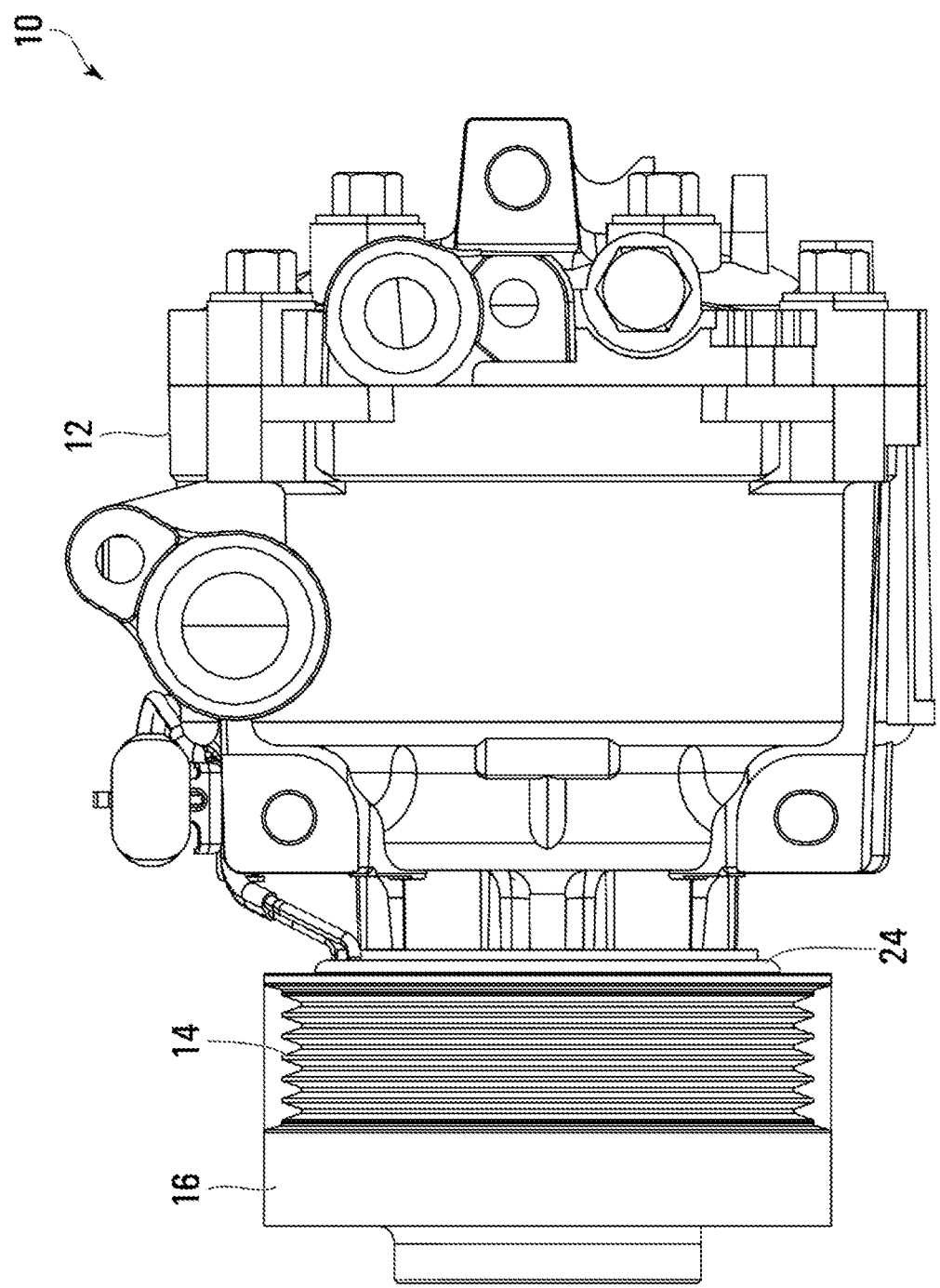
FIG. 1 is a plan view of an automotive air conditioning assembly according to a first embodiment.

For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

FIG. 1 shows an automotive air conditioning (A/C) assembly 10 comprising a compressor such as scroll compressor 12 with a driving pulley 14. A rotary clutch 16, which is substantially encapsulated by the pulley 14, selectively transfers or precludes the transfer of rotary power received by the pulley 14 to a compressor shaft 18 (see FIG. 2) that drives the compressor 12.

Figure 2:
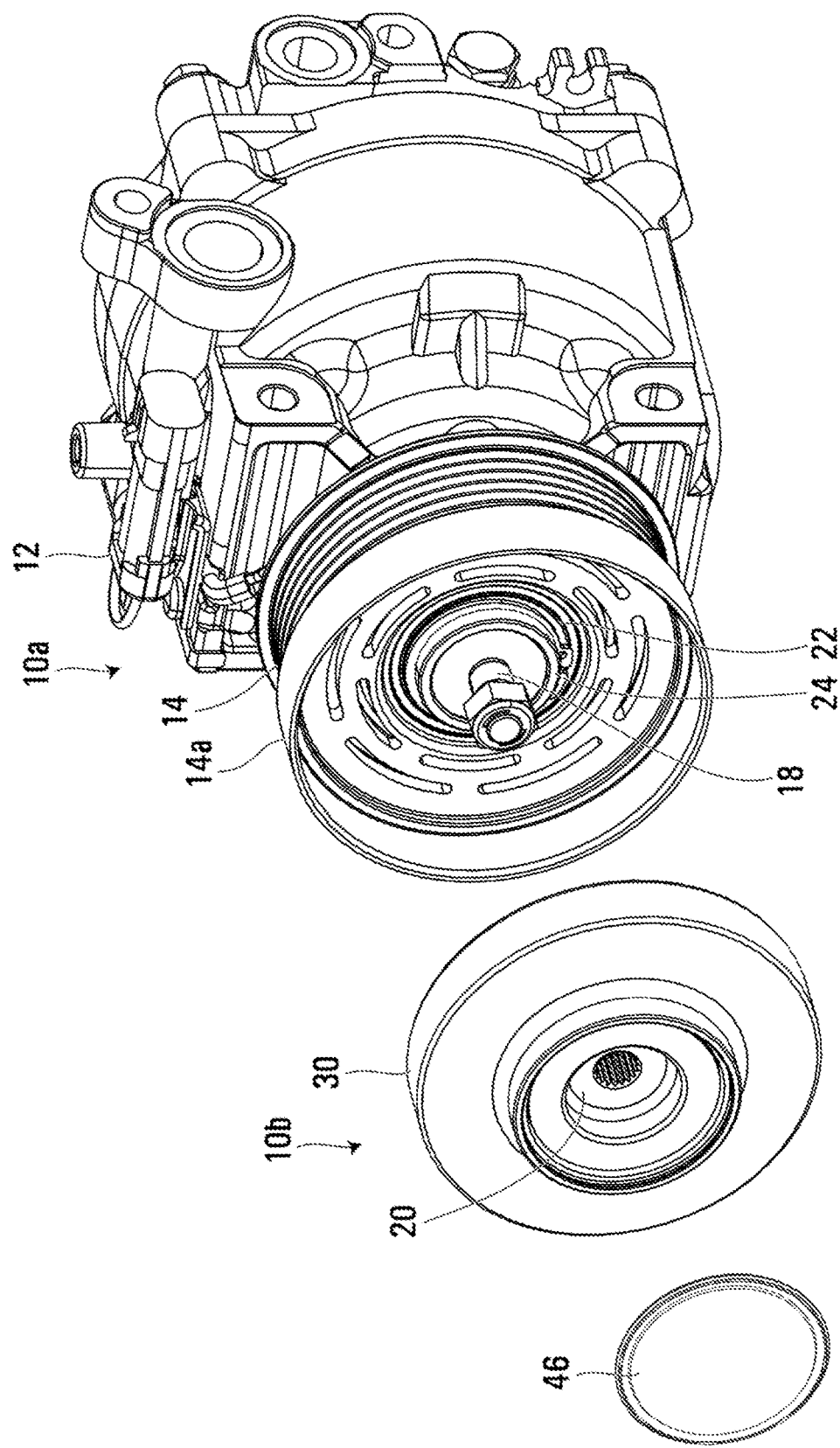
FIG. 2 is a partially exploded view of the air conditioning assembly shown in FIG. 1.
Figure 3A:
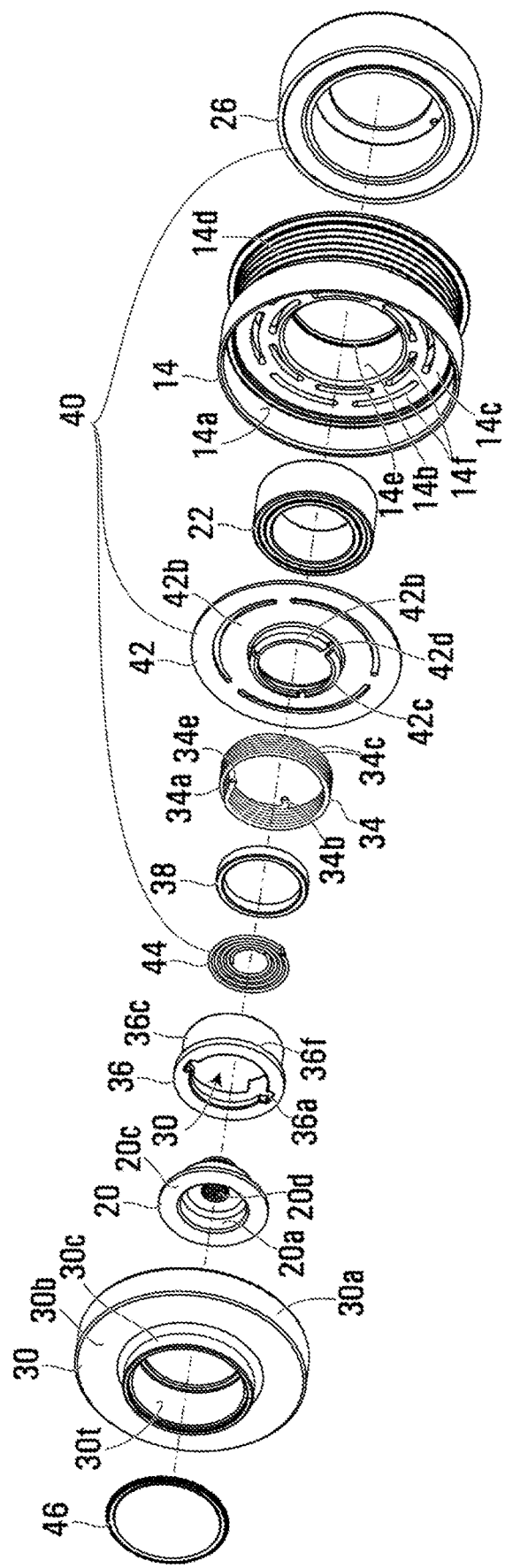
FIG. 3A is an exploded view of a rotary clutch, according to a first embodiment, employed in the air conditioning assembly.
Figure 3B:
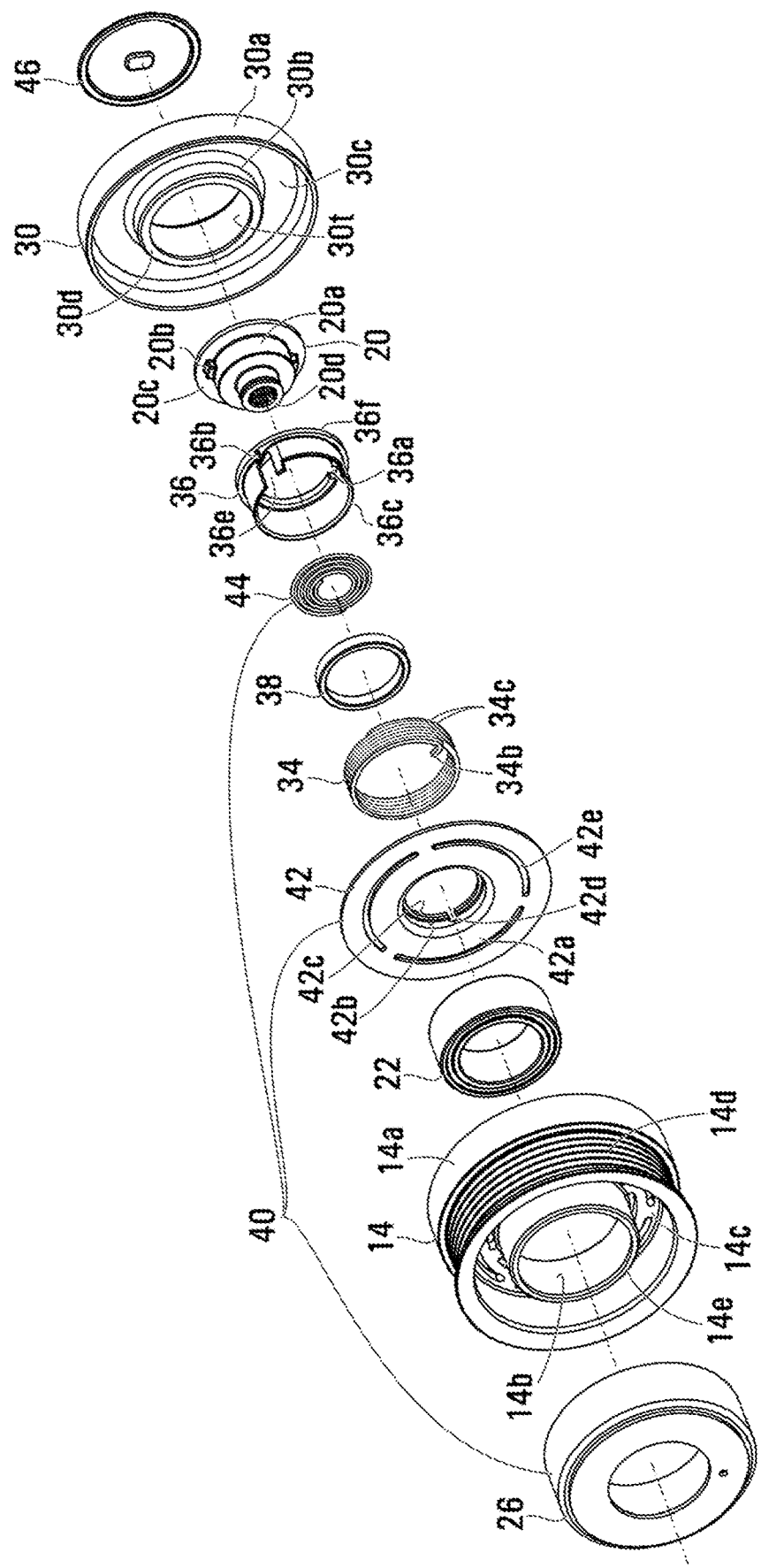
FIG. 3B is an exploded view of the rotary clutch shown in FIG. 3A, taken from an opposing point of view.
Figure 4:
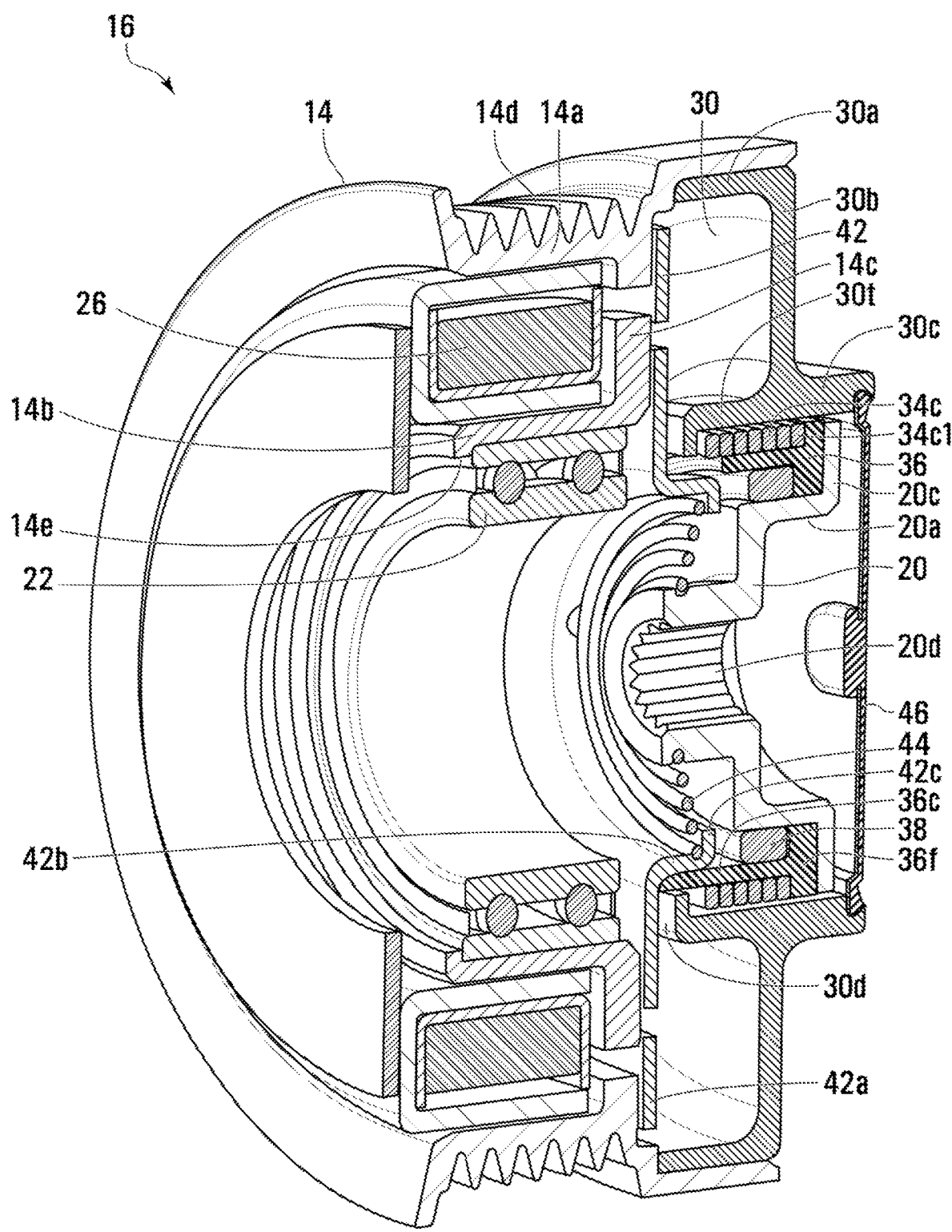
FIG. 4 is a cross-sectional view of the rotary clutch shown in FIGS. 3A and 3B.

Referring additionally to the partially exploded view of the A/C assembly 10 in FIG. 2, the exploded views of the clutch 16 in FIGS. 3A and 3B, and the cross-sectional view of the clutch 16 in FIG. 4, the clutch 16 includes a rotary input portion, which can be provided by the pulley 14, and a rotary output portion, which can be provided by a hub 20 that is fixed to the compressor shaft 18. Due to its function the hub 20 may also be referred to as the shaft driver.

The pulley 14 can include an axially extending, outer circumferential wall 14a, an axially extending, inner circumferential wall 14b, and a transverse (orientated in a radially extending plane) web wall 14c interconnecting the inner and outer circumferential walls 14a and 14b. The walls 14a, 14b and 14c may be integrally formed with one another by machining or stamping operations as known in the art, or otherwise formed from one or more separate pieces that are fixed together. A portion of the outer circumferential wall 14a can include an outer surface 14d designed to receive an endless power transmitting member (not shown) such as a belt.

A bearing 22 can be disposed within the pulley inner circumferential wall 14b, which can include a circumferential lip 14e for locating the bearing 22. The bearing 22 can be mounted to a compressor post 24 (FIG. 2) and enables the pulley 14 to rotate about the compressor post 24 and the compressor shaft 18. In the illustrated embodiment the compressor shaft 18 is itself journaled within the post 24 (not shown) but in alternative embodiments the pulley 14 may be directly journaled to the shaft 18 via a bearing so as to enable each to rotate independent of the other.

An electromagnet 26 can be fixedly mounted to the compressor 12 about the compressor post 24. Collectively, the pulley outer circumferential wall 14a, web wall 14c and inner circumferential wall 14b can provide a circumferential U-shaped channel in which the electromagnet 26 can reside. The electromagnet 26 may be dimensioned slightly smaller than the U-shaped channel so as not to interfere with the pulley rotation.

As seen in FIG. 2, the A/C assembly 10 can be subdivided into manufacturing subassemblies 10a and 10b. Subassembly 10a includes the compressor 12, as well as the electromagnet 26, bearing 22 and pulley 14, which all mounted about the compressor post 24. Subassembly 10b is referred to as a "clutch pack" which, in manufacture, can be mounted to subassembly 10a. More particularly, the clutch pack 10b includes a pulley extension member 30 and the hub or shaft driver 20, the former of which can be affixed to the pulley outer circumferential wall 14a and the latter of which can be affixed to the compressor drive shaft 18.

As can be seen in FIGS. 3A, 3B and 4, the pulley extension member 30 can include an outer circumferential wall 30a, an inner circumferential wall 30c, and a transverse web wall 30b (lying in a radially extending plane) that interconnects the outer and inner circumferential walls 30a, 30c. The outer circumferential wall 30a can be fixedly attached to the pulley outer circumferential wall 14a, such as through a press-fit. The inner circumferential wall 30c can terminate with a radial lip 30d at an axial end proximate the electromagnet 26. The inner circumferential wall 30c and can have a radially inner surface 30t that functions as a clutch or torque transfer surface as discussed in greater detail below.

The hub or shaft driver 20 can be disposed radially inward of the pulley extension member inner circumferential wall 30c and rotates about a common rotary axis with the pulley 14. The hub or shaft driver 20 can include a main circumferential wall 20a featuring one or more lugs 20b (FIG. 3B) thereon, a terminating flange 20c, and a central hole 20d which can be splined as illustrated or threaded to rotationally lock or fix or the hub or shaft driver 20 to the compressor drive shaft 18.

A wrap spring clutch 34 transmits or inhibits the flow of rotary power to the hub or shaft driver 20 from the pulley 14 and its extension member 30. More particularly, the wrap spring clutch 30 has a first or power transfer end portion 34a (FIG. 3A), a second or control end portion 34b, and a plurality of helical coils 34c therebetween for engaging the torque transfer surface 30t provided by the pulley extension member inner circumferential wall 30c. In the illustrated embodiment the wrap spring clutch 34 is an 'opening' spring in the sense that its helical coils 34c expand to grip the torque transfer surface 30t so as to enable the transfer of rotary power from the pulley 14 to the hub or shaft driver 20.

The wrap spring clutch 34 can be wound about a carrier 36. The carrier 36 can include a circumferential wall 36c with an axial extent sufficiently large to accommodate and support a majority, preferably substantially all, of the wrap spring helical coils 34c. At one axial end the carrier circumferential wall 36c can terminate in a flange 36f which supports axially an end helical coil 34c1 corresponding to the wrap spring clutch power transfer end portion 34a.

The carrier flange 36f may be supported on the hub or shaft driver main circumferential wall 20a and may include cutouts 36a (FIG. 3A) for seating the hub or driver shaft lugs 20b. The carrier flange 36f can also include a guide slot 36b (FIG. 3B) for guiding the wrap spring cutch power transfer end 34a so that its circumferentially pointing end 34e abuts the hub or driver shaft lug 20b.

The carrier flange 36f, which guides the end helical coil 34c1, is constrained from axial migration on one side by the hub or shaft driver terminating flange 20c. The carrier flange 36f can be constrained from axial migration on the other side by a retainer ring 38 which can be fixed, such as by press fit, onto the hub or shaft driver main circumferential wall 20a.

The majority of the torque received by the wrap spring clutch 34 is preferably transferred to the hub or shaft driver 20 via the wrap spring clutch power transfer end/lug abutment 34e, 20b so the foregoing means for guiding the power transfer end portion 34a enables a robust and controlled power transfer interface.

In rotary clutch 16 the wrap spring clutch helical coils 34c can be configured with a nominal diameter at most equal to and preferably slightly less than the diameter of the torque transfer surface 34t. It will be noted that some of the helical coils can have slightly different diameters. The helical coils 34c are thus not by default in a strong enough gripping engagement with the torque transfer surface to transfer torque therefrom. The rotary clutch 16 can thus be classified as a "normally disengaged" device.

The control end portion 34b of the wrap spring clutch 34 controls the expansion of the helical coils 34c against the torque transfer surface 30t. The control end portion 34b can feature a tang disposed in a circumferential rebate 36e (FIG. 3B) at an end of the carrier circumferential wall 36c opposing the flange 36f. When the control end portion 34b is operatively coupled to the rotating pulley 14, the helical coils 34c are induced to expand and enter into gripping engagement with the torque transfer surface 30t.

An actuator 40 controls the relative position of the wrap spring clutch control end portion 34b. The actuator 40 includes the electromagnet 26 and an armature which can include an armature plate 42 and an armature biasing spring 44. The armature plate 42 is disposed for rotation about the common rotational axis and is moveable axially. The armature plate 42 can include an outer plate portion 42a (lying in a radially extending plane) and an inner circumferential wall portion 42b which terminates in a circumferential flange 42c. As seen best in FIG. 4, the plate portion 42a can be constrained axially, with play, between the pulley web wall 14c and the pulley extension member 30, such as its radial lip 30d. The armature inner circumferential wall portion 42b can slide within the carrier circumferential wall 36c, which assists in stabilizing or minimizing wobble in the axially sliding armature 42 and in maintaining a consistent air gap. The carrier circumferential wall 36c, which can have some elasticity to it in comparison with the otherwise metallic parts of the clutch, can be supported by the radial lip 30d of the pulley extension member inner circumferential wall 30c. The armature biasing spring 44 acts between the circumferential flange 42c of the armature plate 42 and the hub or shaft driver 20 to bias the armature plate 42 away from the electromagnet 26.

The wrap spring clutch control end portion 34b may be disposed in a notch 42d provided in the armature flange 42c.

A magnetic circuit arises between the electromagnet 26, the pulley web wall 14c and the armature plate 42. Optionally, as seen best in FIG. 3A, the pulley web wall 14c preferably features at least one series of circumferential slots 14f in the radial plane. The pulley web wall 14c of the illustrated embodiment features a first series of slots disposed along a first radius and a second serious of slots disposed along a second radius, wherein the radii originate at the common rotational axis. Optionally, the armature plate 42 likewise preferably features at least one series of circumferential slots 42e in the radial plane that is offset radially with respect to the circumferential slots 14f in the pulley web wall 14c. The armature plate 42 of the illustrated embodiment features a single series of slots disposed along a third radius intermediate the first and second radii. While the exact arrangement of slots 14f, 42e may be modified to suit any particular application, this, and similar, arrangements assist in focusing and guiding the magnetic flux through the affected parts to reduce current requirements in comparison to solid structures.

When the actuator 40 is activated, the electromagnet 26 draws, and clamps, the armature plate 42 axially into an engaged position against the pulley web wall 14c. The armature plate 42 thus rotates together with the pulley 14, dragging the control end portion 34b of the wrap spring clutch 34, which causes the helical coils 34c thereof to expand into strong gripping engagement with the torque transfer surface 30t of the pulley extension member 30. The rotational movement of the pulley 14 and pulley extension member 30 is imparted to the wrap spring clutch 34 which, in turn, imparts rotational movement to the hub or shaft driver 20 via the power transfer end portion 34a.

When the actuator 40 is de-activated, the biasing spring 44 urges the armature plate 42 into its rest or disengaged position, whereby the helical coils 34c of the wrap spring clutch 34 disengage from the torque transfer surface 30t.

The biasing spring 44 may be omitted in some applications. The need for it often depends on issues of residual magnetism which can depend on the specific materials selected for the electromagnet housing and the armature plate, the size of the magnetic air gap, and other factors such as means to mitigate residual magnetism by periodically reversing the flux through the magnetic circuit.

The clutch 16 may require the application of grease in order to meet durability and/or longevity demands. Grease has a tendency to move axially away from the required surfaces, such as the wrap spring clutch/torque transfer surface interface. In order to mitigate grease migration and leakage, at one axial end a sealing structure is provided by the carrier flange 36f and hub or shaft driver wall 20c. At the opposing axial end, grease migration is mitigated by the radial lip 30d of the pulley extension member inner circumferential wall 30c which is sealed by the carrier circumferential wall 36c and overlying armature plate circumferential portion 42b.

A clutch sealing cap 46 seals the clutch 16.

The A/C assembly 10 has a number of advantages over the conventional A/C assembly which comprises a variable piston or scroll compressor in combination with a friction clutch. For example, the rotary clutch 16 can be considerably more efficient than friction clutches. For instance, in a typical application the rotary clutch 16 with a 10 ohm electromagnet coil needs typically less than 15 Watts peak power to initially activate the clutch and less than 5 Watts continuous power to maintain the clutch in engagement. In comparison, a friction clutch typically requires 40 Watts continuous power.

As another example, the torque holding capacity of the rotary clutch 16 is not highly dependent on the diameter of the pulley or the amount of current applied to the electromagnet. For example, the rotary clutch 16 can have an 85 mm diameter pulley as opposed to, for example, a 95 mm diameter pulley for a friction clutch. Depending on the size of the crankshaft pulley the 10 mm difference in pulley sizes could result in the pulley, and hence the compressor drive shaft, spinning comparatively 10-20 percent faster. This additional speed will increase cooling capacity at idle for a given compressor displacement. The additional cooling capacity may enable one to replace a more expensive variable piston compressor with a less expensive scroll compressor in some A/C applications. Alternatively, as the smaller pulley size enables higher compressor speeds, the rotary clutch 16 may enable a lower displacement compressor to be substituted for a higher displacement compressor in some A/C applications.

Persons skilled in the art will appreciate that there are yet more alternative implementations and modifications possible, and that the above examples are only illustrations of one or more implementations. The scope, therefore, is only to be limited by the claims appended hereto and any amendments made thereto.

The invention claimed is:

1. A clutch for an air conditioning compressor which includes a drive shaft defining a rotary axis, the clutch comprising:
 a pulley mounted to the compressor for rotation about the rotary axis, the pulley having an outer circumferential surface configured to be driven by an endless power transmitting member, an inner circumferential surface providing a clutch torque transfer surface, and a circumferential U-shaped channel;
 a hub configured to be secured to the compressor drive shaft, the hub including a drive lug;
 a wrap spring clutch, the wrap spring clutch having a power transfer end portion, a control end portion, and a plurality of helical coils therebetween for engaging the torque transfer surface;
 a carrier, the carrier having a circumferential wall and a flange at an axial end thereof, the carrier circumferential wall supporting a plurality of the helical coils, the flange having a groove for guiding the power transfer end portion so that an end thereof is in abutting relationship with the hub drive lug; and
 an actuator, including an electromagnet and an armature plate connected to the wrap spring clutch control end portion;
 wherein the electromagnet is mounted to the compressor and is disposed within the U-shaped channel, the armature plate has a circumferential wall slidably disposed within the carrier circumferential wall, and the armature plate is axially moveable between an engaged position, in which the armature plate is in abutting relationship with the pulley, and a disengaged position, in which the armature plate is not in abutting relationship with the pulley;
 wherein the pulley also includes a web wall arranged in a radial plane, the pulley web wall having at least one series of circumferential slots therein, and wherein the armature plate also includes at least one series of circumferential slots therein that is offset radially with respect to the circumferential slots in the pulley web wall; and
 wherein activating the electromagnet generates a magnetic field that urges the armature plate to the engaged position so that the armature plate rotates together with the pulley, wherein rotation of the armature plate causes the helical coils to expand into gripping engagement with the torque transfer surface to thereby impart rotational movement to the wrap spring clutch which, in turn, imparts rotational movement to the hub.

2. A clutch as claimed in claim 1, wherein the compressor features a post; a bearing is mounted to the post; and the pulley is mounted to the bearing.

3. A clutch as claimed in claim 2, wherein the pulley is formed from at least two parts including a pulley member and a pulley extension member, wherein:

the pulley member includes a pulley outer circumferential wall, the pulley web wall, and a pulley inner circumferential wall, which collectively provide said U-shaped channel, and
 the pulley extension member includes an outer circumferential wall, an inner circumferential wall, and a transverse web wall that interconnects the outer and inner circumferential walls, wherein the pulley outer circumferential wall being secured to the pulley extension member outer circumferential wall.

4. A clutch as claimed in claim 3, wherein the pulley outer circumferential wall features the outer circumferential surface configured to be driven by the endless power transmitting member.

5. A clutch as claimed in claim 4, wherein the pulley inner circumferential wall is secured to the bearing.

6. A clutch as claimed in claim 1, wherein the carrier circumferential wall has an axial extent sufficiently large to accommodate and support substantially all of helical coils.

7. An automotive air conditioning assembly comprising:
 a compressor, including a drive shaft defining a rotary axis;
 a clutch including a pulley mounted to the compressor for rotation about the rotary axis, the pulley having an outer circumferential surface configured to be driven by an endless power transmitting member, and an inner circumferential surface that is a clutch torque transfer surface;
 a hub configured to be secured to the compressor drive shaft, the hub including a drive lug;
 a wrap spring clutch, the wrap spring clutch having a power transfer end portion, a control end portion, and a plurality of helical coils therebetween for engaging the torque transfer surface;
 a carrier guiding the power transfer end portion so that an end thereof is in abutting relationship with the hub drive lug; and
 an actuator, including an electromagnet and an armature plate connected to the wrap spring clutch control end portion, wherein the electromagnet is mounted to the compressor, and the armature plate is axially moveable between an engaged position, in which the armature plate is in abutting relationship with the pulley, and a disengaged position, in which the armature plate is not in abutting relationship with the pulley,
 wherein the pulley has a diameter of at most 85 mm and the electromagnet requires less than 15 Watts power to generate a magnetic field in order to urge the armature plate to the engaged position so that the armature plate rotates together with the pulley, wherein rotation of the armature plate causes the helical coils to expand into gripping engagement with the torque transfer surface to thereby impart rotational movement to the wrap spring clutch which, in turn, imparts rotational movement to the hub and compressor drive shaft.

8. An automotive air conditioning assembly as claimed in claim 7, wherein the compressor is a scroll compressor.

9. A clutch for an air conditioning compressor which includes a drive shaft defining a rotary axis, the clutch comprising:
 a pulley mounted to the compressor for rotation about the rotary axis, the pulley having an outer circumferential surface configured to be driven by an endless power transmitting member, and an inner circumferential surface providing a clutch torque transfer surface;
 a hub configured to be secured to the compressor drive shaft, the hub including a drive lug;

a wrap spring clutch, the wrap spring clutch having a power transfer end portion, a control end portion, and a plurality of helical coils therebetween for engaging the torque transfer surface;

a carrier, the carrier having a circumferential wall and a flange at an axial end thereof, the carrier circumferential wall supporting a plurality of the helical coils, the flange having a groove for guiding the power transfer end portion so that an end thereof is in abutting relationship with the hub drive lug; and an actuator, including an electromagnet and an armature plate connected to the wrap spring clutch control end portion, wherein the electromagnet is mounted to the compressor, the armature plate has a circumferential wall slidably disposed within the carrier circumferential wall, and the armature plate is axially moveable between an engaged position, in which the armature plate is in abutting relationship with the pulley, and a disengaged position, in which the armature plate is not in abutting relationship with the pulley, wherein the carrier circumferential wall has an axial extent sufficiently large to accommodate and support substantially all of helical coils.

* * * * *